United States Patent
Schwabe et al.

(10) Patent No.: US 7,082,829 B2
(45) Date of Patent: Aug. 1, 2006

(54) FERRARIS SENSOR

(75) Inventors: Michael Schwabe, Hemhof (DE); Ralph Schmidt, Sondermoning (DE); Lutz Rissing, Seebruck (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/479,107

(22) PCT Filed: May 7, 2002

(86) PCT No.: PCT/EP02/04992

§ 371 (c)(1),
(2), (4) Date: Jul. 12, 2004

(87) PCT Pub. No.: WO02/095422

PCT Pub. Date: Nov. 28, 2002

(65) Prior Publication Data

US 2004/0237649 A1    Dec. 2, 2004

(30) Foreign Application Priority Data

May 23, 2001 (DE) ............... 101 25 097

(51) Int. Cl.
G01P 15/08    (2006.01)
(52) U.S. Cl. ................... 73/514.31
(58) Field of Classification Search ............ 73/514.31, 73/519.01, 514.39; 324/164, 207.13, 207.21, 324/207.22, 207.24
See application file for complete search history.

(56) References Cited

U.S. PATENT DOCUMENTS 2,460,115 A    1/1949  Adamson ............ 324/162
3,932,813 A *  1/1976  Gallant .............. 324/164
4,095,177 A *  6/1978  Harris ............... 324/164
4,751,459 A    6/1988  Stupak, Jr. .......... 324/164
6,326,777 B1  12/2001  Penny ............... 324/164

(Continued)

FOREIGN PATENT DOCUMENTS

DE    37 30 841 A1    3/1988

(Continued)

OTHER PUBLICATIONS

Patent Abstracts of Japan regarding Japanese Publication 61-223564, published by Japanese Patent Office, 1986, one page.

(Continued)

Primary Examiner—Hezron Williams
Assistant Examiner—Tamiko Bellamy
(74) Attorney, Agent, or Firm—Brinks Hofer Gilson & Lione

(57) ABSTRACT

A Ferraris sensor for measuring an acceleration of a moving body along a direction. The sensor includes a flat eddy current body and a scanning head arranged on one side of the eddy current body. The scanning head includes N magnets that generate an external magnetic field that extends approximately perpendicular to a surface of the eddy current body, wherein N=1, 2, 3, . . . and M detector coils, wherein M=1, 2, 3, 4, . . . and each detector coil includes an axis and detects changes of an interior magnetic field within the N magnets that are caused by an acceleration of the eddy current body and a resulting change in eddy currents. The axis is approximately perpendicular with respect to the surface of the eddy current body, each detector coil lacks a ferromagnetic core and the N magnets and the M detector coils are arranged alternatingly next to each other in a direction that the acceleration is to be measured.

15 Claims, 3 Drawing Sheets

U.S. PATENT DOCUMENTS 6,462,535 B1 * 10/2002 Schwabe .................... 324/164
6,464,535 B1 * 10/2002 Murakami et al. .......... 439/589
6,736,009 B1 * 5/2004 Schwabe ................. 73/514.31

FOREIGN PATENT DOCUMENTS

| DE | 199 47 277 A1 | 4/2001 |
| EP | 0 886 145 A1 | 12/1998 |
| FR | 1449316 | 8/1966 |
| JP | 61-223564 A | 10/1986 |
| JP | 61223564 A * | 10/1986 |
| WO | WO 02/12904 A1 | 2/2002 |

OTHER PUBLICATIONS

Roger Allan, "Coil-Based Micromachined Sensor Measures Speed and Position for Automotive Applications," Electronic Design, Dec. 16, 1996, pp. 34, 35, 37.

* cited by examiner

FERRARIS SENSOR

Applicants claim, under 35 U.S.C. §§ 120 and 365, the benefit of priority of the filing date of May 7, 2002 of a Patent Cooperation Treaty patent application, copy attached, Ser. No. PCT/EP02/04992, filed on the aforementioned date, the entire contents of which are incorporated herein by reference, wherein Patent Cooperation Treaty patent application Ser. No. PCT/EP02/04992 was not published under PCT Article 21(2) in English.

Applicants claim, under 35 U.S.C. § 119, the benefit of priority of the filing date of May 23, 2001 of a German patent application, copy attached, Ser. No. 101 25 097.5, filed on the aforementioned date, the entire contents of each of which are incorporated herein by reference.

BACKGROUND OF THE INVENTION

1. Field of the Invention

The present invention relates to a Ferraris sensor for measuring a parameter of a moving object, such as an acceleration of the moving object.

2. Description of the Related Art

Velocity or acceleration sensors based on the principle of eddy current measurements are also called Ferraris sensors. Exterior magnetic fields generate eddy currents in a moving, electrically conducting, non-ferromagnetic body, whose strength is a function of the relative speed between the exterior magnetic field and the moving body. Interior magnetic fields, which are overlaid on the exterior magnetic fields, are linked to these eddy currents. If the strength of these interior magnetic fields is detected, for example by Hall sensors, a signal is obtained which is proportional to the velocity of the moving body.

Accelerations, i.e. changes in the velocity of the moving body, change the interior magnetic field linked to the eddy currents, so that voltages which are proportional to the acceleration, are induced in detector coils.

Detectors operating in accordance with the Ferraris principle thus permit the direct measurement of a velocity or an acceleration.

Such an eddy current detector is known from DE 37 30 481 A1, which can be used as a tachometer or acceleration meter. It contains a non-magnetic electrically conductive body, whose velocity or change in velocity is to be measured. A constant magnetic field is generated substantially perpendicular with respect to the movement direction and leads to eddy currents in the moved body, which in turn cause an eddy current magnetic field. When employed as a tachometer, the flux density of the eddy current field is measured by a Hall effect sensor, whose output signal is proportional to the velocity. When employed as an acceleration meter, the change over time of the flux density of the eddy current effect is measured by a coil, whose output voltage is proportional to the acceleration.

The large amount of space as a result of the use of an encompassing yoke structure is disadvantageous. Moreover, the yoke in addition also prevents the employment of the sensor for measurement on a body which can be freely displaced on a level, since one direction at least is limited because of the yoke.

An eddy current detector which does not use an encompassing yoke, is proposed by JP 61223564. Three magnetic poles are created by two coils, through which a dc current flows in opposite directions, starting from which an exterior magnetic field penetrates an eddy current disk. In this case the magnetic poles are arranged one behind the other in the direction of the movement to be detected. However, the arrangement of the coils does not permit an optimal detection of the generated eddy currents and therefore no satisfactory signals can be obtained.

SUMMARY AND OBJECTS OF THE INVENTION

It is an object of the present invention to disclose a Ferraris sensor which is compactly constructed and provides the best possible signals.

This object is attained by a Ferraris sensor for measuring an acceleration of a moving body along a direction. The sensor includes a flat eddy current body and a scanning head arranged on one side of the eddy current body. The scanning head includes N magnets that generate an external field that extends approximately perpendicular to a surface of the eddy current body, wherein N=1, 2, 3, . . . and M detector coils, wherein M=1, 2, 3, . . . and each detector coil includes an axis and detects changes of an interior magnetic field within the N magnets that are caused by an acceleration of the eddy current body and a resulting change of eddy currents. The axis is approximately perpendicular with respect to the surface of the eddy current body, each detector coil lacks a ferromagnetic core and the N magnets and the M detector coils are arranged alternatingly next to each other in a direction that the acceleration is to be measured.

Now the detector coils for detecting an interior magnetic field linked with the eddy currents are attached in a scanning head of a Ferraris sensor between, or next to the permanent magnets used for generating an exterior magnetic field. In this case magnets and detector coils are arranged on only one side of a flat eddy current body and alternatingly next to each other in the direction of the acceleration to be measured. No encompassing yoke is used, which results in a compact construction of the sensor. In order to obtain optimal signals in spite of this, the coil axes of the detector coils are arranged perpendicularly with respect to the surface of the eddy current body. The optimal detection of the interior magnetic field is made possible in this way, since the axes of the detector coils are approximately congruent with the axes of rotation of the eddy currents. In a preferred embodiment, detector coils without iron cores are used, since this permits the detection of the acceleration at a high chronological resolution. A further embodiment is moreover suggested, in which the detector coils are embodied as strip conductors on a board. This leads to a further miniaturization of the scanning head of the Ferraris sensor.

Further advantages, as well as details, of the present invention ensue from the following description of various embodiments by the drawings. Shown are in:

DESCRIPTION OF THE PREFERRED EMBODIMENT(S) OF THE INVENTION

Figure 1:
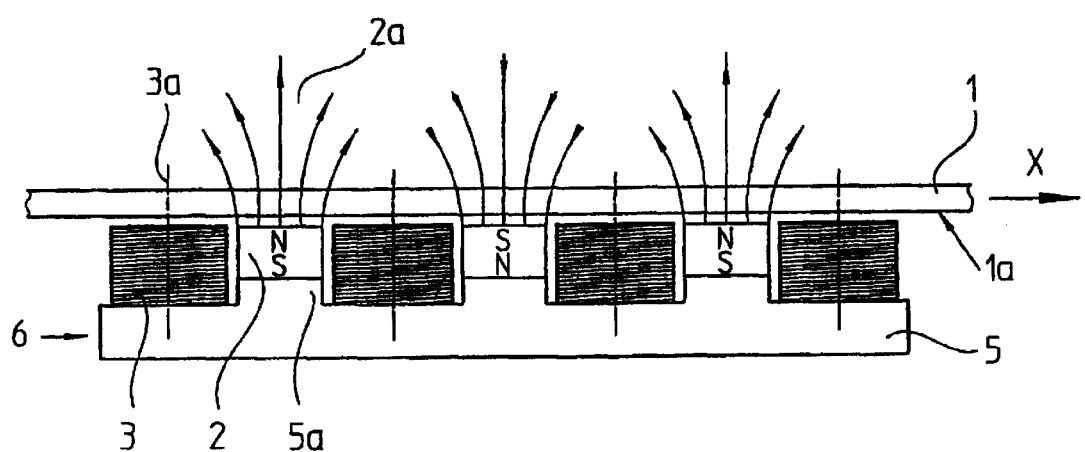
FIG. 1 shows an embodiment of a Ferraris sensor in a lateral view in accordance with the present invention.

An embodiment of a Ferraris sensor for measuring accelerations of a moving object is represented in a lateral view in FIG. 1. A flat eddy current body 1 is fastened here either on the moving object, or the moving object itself is suitable as the eddy current body 1. The material of the eddy current body 1 must be electrically conductive and should not be magnetic. Copper and aluminum are examples of suitable materials. A scanning head 6 is constructed in such a way that it is exclusively arranged on one side of the eddy current body 1. The scanning head 6 can of course also be fastened on the moving object and be placed opposite a stationary eddy current body.

Furthermore, three magnets 2 can be seen in FIG. 1, which are arranged in the direction X in alternating magnetic orientation along the acceleration to be detected. Since the distance between the magnets 2 and the eddy current body 1 is kept as short as possible (approximately 0.5 mm or less), the exterior magnetic field 2a penetrates the surface 1a of the eddy current body 1 approximately perpendicularly. Four detector coils 3 can be seen next to the magnets 2, whose coil axes 3a also extend perpendicularly with respect to the surface 1a of the eddy current body 1. In actual use, such arrangements of three magnets 2 and four detector coils 3 have been shown to represent a particularly advantageous compromise between structural size and signal strength. However, arrangements with other numbers of magnets and detector coils are possible. However, in every case the magnets 2 and the detector coils 3 are alternatingly arranged in a direction X of the acceleration to be measured. The magnetic pole facing the eddy current body 1 here changes from one magnet 2 to another magnet 2.

Figure 2:
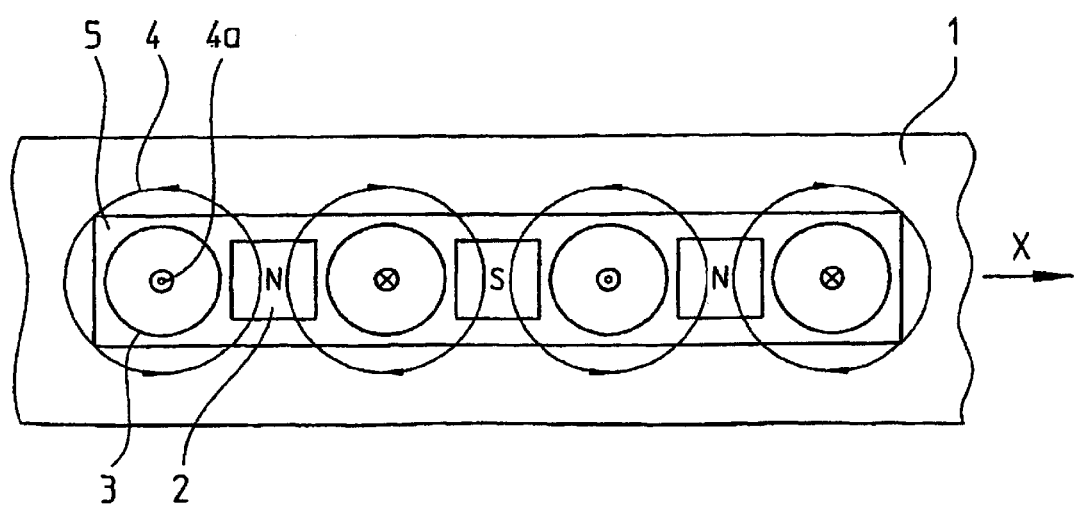
FIG. 2 shows the Ferraris sensor from FIG. 1 in a view from above.

FIG. 2 shows the arrangement in FIG. 1 in a view from above. Eddy currents 4 are generated by the movement between the scanning head 6 and the eddy current body 1. In FIG. 2 the eddy currents 4 are represented simplified in the form of circles. Therefore an eddy current 4 is created in the movement direction X behind a north pole of a magnet 2, which replaces the exterior magnetic field 2a by an interior magnetic field 4a of the same direction. To this end the eddy current 4 must circulate in a counterclockwise direction when viewed from above. This applies correspondingly to the area in front of a north pole, or for the areas in front of or behind a south pole of a magnet 2. A weaker eddy current 4 forms ahead of the first, or behind the last magnet 2, because the local changes of the exterior magnetic field are only half as large. The directions of all exterior magnetic fields 2a, eddy currents 4 and interior magnetic fields 4a can be taken from FIGS. 1 and 2.

With a constant movement, the eddy currents 4, and therefore the interior magnetic fields 4a, are also constant, no voltage is induced in the detector coils 3. However, an acceleration in the movement in direction X causes a change of the eddy currents 4, and therefore also of the interior magnetic fields 4a. Since the interior magnetic field 4a extends through the detector coils 3, voltages which are proportional to the acceleration are now induced in the detector coils 3. The acceleration can be determined by evaluating the voltages in an electronic follow-up device.

Thanks to their arrangement in accordance with the present invention, the detector coils 3 detect the interior magnetic fields 4a particularly well because their coil axes 3a are located approximately congruently with the respective axes of rotation of the eddy currents 4. This is achieved in that, as represented in FIG. 1, the detector coils 3 are arranged in a row with and respectively next to the magnets 2. In this case the spaces between two magnets 2 are to be first occupied by detector coils 3, because stronger interior magnetic fields 4a act there, so that better signals can be obtained from the individual detector coils 3. If needed, however, the two positions ahead of the first and after the last magnet 2 can be occupied by detector coils 3. In general, Ferraris sensors with N magnets 2 deliver maximum signals with M=N+1 detector coils 3. In this case N is a whole number greater than or equal to 1. Note that it is also possible to have M=N or M=N-1 in the case where N is greater than or equal to 2.

The detector coils 3 provide stronger output signals if their core is filled with a ferromagnetic material for focusing the interior magnetic fields 4a. However, detector coils 3 without a ferromagnetic core are preferred, since they permit an improved chronological resolution of the acceleration. It is possible to realize coils with a core of non-ferromagnetic material, or air coils without a core for this purpose.

It is furthermore advantageous to arrange the magnets 2 and the detector coils 3 on a ferromagnetic support structure 5. In this case the magnets 2 can be attached to protrusions 5a of this support structure 5. Since the upper edges of the detector coils 3 and the magnets 2 are sensibly located at the same height in order to make possible the shortest possible distance of both elements from the eddy current body 1, the protrusions 5a permit the use of flatter, and therefore less expensive magnets 2. Because of the mentioned shortest distance possible, the exterior magnetic field 2a is impressed on the eddy current body 1 and the largest portion of the interior magnetic field 4a is detected. This decisively adds to the signal quality of the scanning head 6.

In a manner not represented, individual magnets 2 can be replaced by protrusions 5a, for example the center magnet 2 or, alternatively the two outer magnets 2 from FIG. 1. For the reasons mentioned above, the upper edge of the protrusion 5a should terminate flush with the magnets 2 and detector coils 3. The saving of one magnet 2 leads to a weakening of the exterior magnetic field 2a and to weaker signals in the end.

Figure 3:
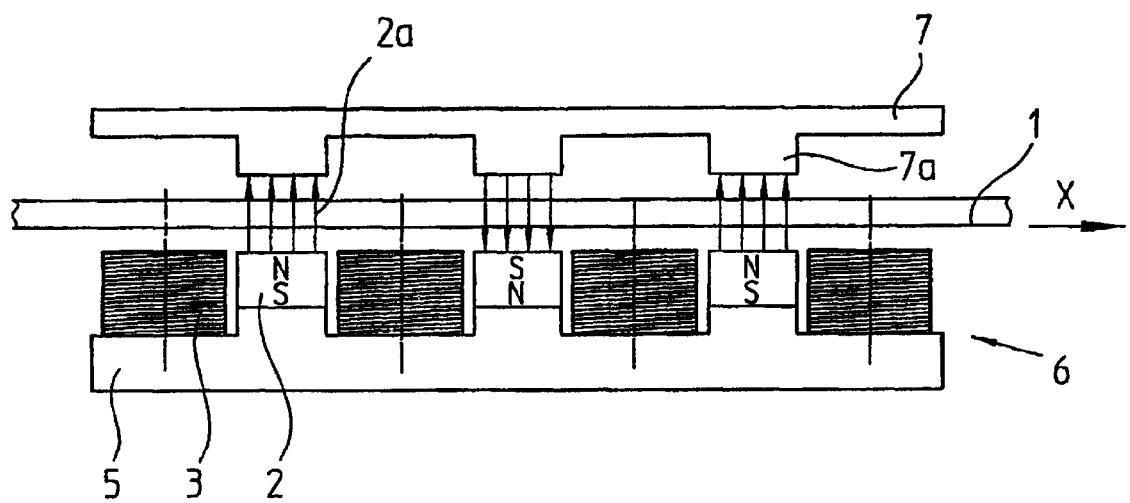
FIG. 3 shows a lateral view of the a Ferraris sensor of FIG. 1 with an embodiment of a counter-structure in accordance with the present invention.

It is shown in FIG. 3 how the signal quality of the scanning head 6 can be further increased when needed. If the respective application permits, it is possible to arrange a counter-structure 7 of a ferromagnetic material, for example in the form of a plate, opposite the scanning head 6. Also, protrusions 7a can be advantageously provided, which are located opposite the magnets 2 and therefore focus the magnetic field 2a specifically, or even further magnets 2, which strengthen the exterior magnetic field 2a, can be employed instead of only the protrusions 7a. In an extreme case a second scanning head 6, including the detector coils 3, can be employed as the counter-structure 7. In the course of this it is of course necessary to take care that respective different poles are located opposite each other in the case of magnets 2 located opposite each other. However, no magnetic closure between the scanning head 6 and the counter-structure 7 is required, so in this respect the structural design of the Ferraris sensor can be provided altogether freely.

In the course of producing acceleration meters in the form of Ferraris sensors operating in accordance with the present invention it is advantageous that the counter-structure 7 can be selected by means of sort of a building block system, depending on the respective type of use, if each one has the same exterior shape, but different components; a counter-structure 7 made of a ferro- magnetic material with protrusions 7a provides better signals than an acceleration meter without a counter-structure, but a counter-structure 7 with magnets 2 surpasses it.

In the version represented in FIGS. 1 to 3, scanning heads 6 of the described type are particularly suited as sensors for linear movements. In the case of the arrangement of the magnets 2 and detector coils 3 on segments of a circle, the detection of appropriate rotary movements is improved.

The detector coils 3 of the Ferraris sensor in accordance with the present invention can be produced in the most diverse ways. Wound coil bodies, whose geometry is adapted to the respective conditions can be used, the same as self-supporting coils which are supported by a casting compound, for example.

Figure 4:
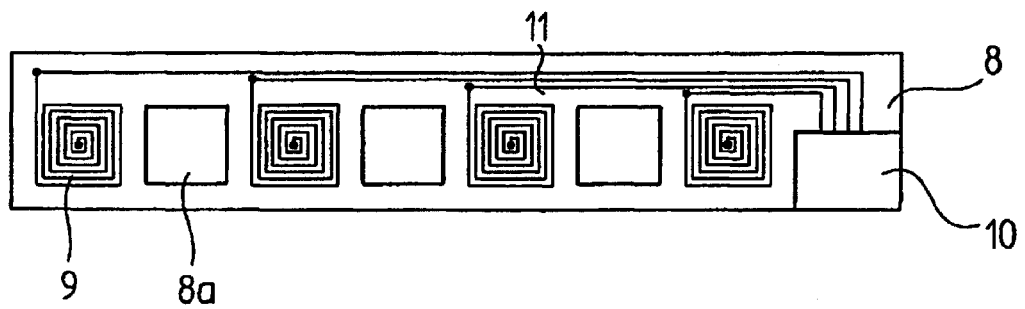
FIG. 4 shows a bottom view of an embodiment of a printed circuit board with detector coils in accordance with the present invention.
Figure 5:
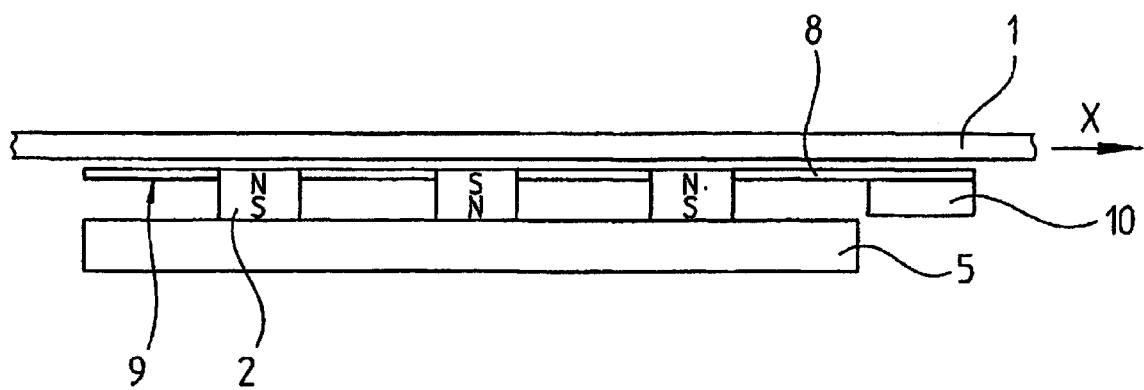
FIG. 5 shows a lateral view of an embodiment of a Ferraris sensor that employs the printed circuit board with detector coils of FIG. 4 in accordance with the present invention.

A particularly advantageous embodiment of the detector coils 3 will be described in what follows. The assembly and wiring of the above described detector coils 3 might pose problems because of the narrow wire diameters employed. It is simpler to construct the detector coils 3 in the way shown in FIG. 4 as helical strip conductors 9 on a printed circuit board 8. It is possible for achieving a high number of windings, multi-layered printed circuit boards 8 can also be used, whose windings are connected between the layers. The printed circuit board 8 has openings 8a for receiving magnets 2. As represented in FIG. 5, in this case the magnets 2 are glued into the openings 8a of the printed circuit board 8 in such a way that their surface terminates flush with the surface of the magnets 2. This in turn permits the assembly of the scanning head 6 with a minimal distance of the detector coils 3 (in this case the helical strip conductors 9) and the magnets 2 from the eddy current body 1. In turn, a ferromagnetic support structure 5 for focusing the magnetic fields can be provided on the back of this scanning head 6 with a printed circuit board 8 supporting detector coils 3.

In this case the wiring of the detector coils 3 with each other (useful in all variants so far described, for example for producing a differential signal for becoming autonomous of exterior interference fields) can be provided by strip conductors 11 on the printed circuit board 8. It is even possible to house the electronic follow-up device 10, which is required for evaluating the signals from the detector coils 3, partially or as a whole on the printed circuit board 8.

Further embodiment variations of the method in accordance with the present invention of course exist besides the explained example.

We claim:

1. A Ferraris sensor for measuring an acceleration of a moving body along a direction, comprising:
    a flat eddy current body;
    a scanning head arranged on one side of said eddy current body, said scanning head comprising:
        N magnets that generate an external magnetic field that extends approximately perpendicular to a surface of said eddy current body, wherein N=1, 2, 3, . . . ;
        M detector coils, wherein M=1, 2, 3, . . . and each detector coil comprises an axis and detects changes of an interior magnetic field that are caused by an acceleration of said eddy current body and a resulting change of eddy currents, wherein said axis is approximately perpendicular with respect to said surface of said eddy current body, each detector coil lacks a ferromagnetic core and said N magnets and said M detector coils are arranged alternatingly next to each other in a direction that said acceleration is to be measured; and
    a printed circuit board that includes said M detector coils.

2. The Ferraris sensor in accordance with claim 1, wherein each of said M detector coils is embodied as helical strip conductor.

3. The Ferraris sensor in accordance with claim 2, wherein said printed circuit board is embodied to have several layers, and said helical strip conductors are connected together over said several layers to form said M detector coils.

4. The Ferraris sensor in accordance with claim 3, further comprising:
    an electronic follow-up device connected to said helical strip conductors via additional strip conductors on said printed circuit board.

5. The Ferraris sensor in accordance with claim 4, wherein said electronic follow-up device is arranged at least partially on said printed circuit board.

6. The Ferraris sensor in accordance with claim 1, wherein said printed circuit board comprises opening for receiving said N magnets.

7. The Ferraris sensor in accordance with claim 1, wherein said N magnets are arranged with alternating polarity and between said M detector coils, wherein said M detector coils are lined up in said direction and M=N+1.

8. The Ferraris sensor in accordance with claim 7, wherein N=3.

9. The Ferraris sensor in accordance with claim 1, wherein said N magnets and said M detector coils are arranged on a ferromagnetic support structure.

10. The Ferraris sensor in accordance with claim 9, wherein said ferromagnetic support structure comprises protrusions on which said N magnets are arranged.

11. The Ferraris sensor in accordance with claim 1, further comprising a ferromagnetic counter-structure arranged opposite said scanning head, so that said eddy current body is located between said scanning head and said counter-structure.

12. The Ferraris sensor in accordance with claim 11, wherein said counter-structure comprises protrusions for focusing said exterior magnetic field generated by said N magnets.

13. The Ferraris sensor in accordance with claim 11, wherein said counter-structure comprises a strengthening magnet for strengthening said exterior magnetic field.

14. The Ferraris sensor in accordance with claim 11, wherein said counter-structure comprises a further detector coil.

15. The Ferraris sensor in accordance with claim 14, wherein said counter-structure defines a further scanning head.

* * * * *